Figure 1:
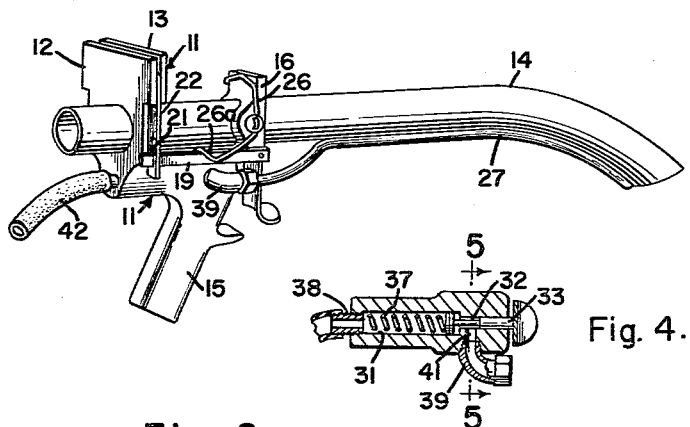

July 30, 1963 — F. H. INE — 3,099,039
EVISCERATING METHOD
Original Filed Feb. 27, 1958 — 2 Sheets-Sheet 1

INVENTOR.
Frank H. Ine
BY
Townsend and Townsend
attorneys

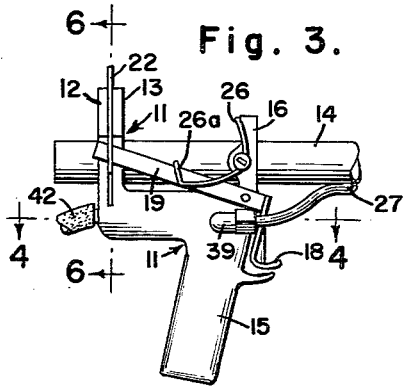
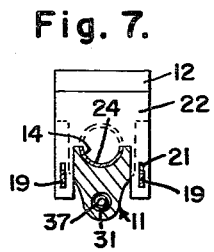
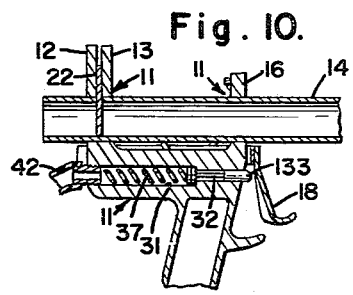
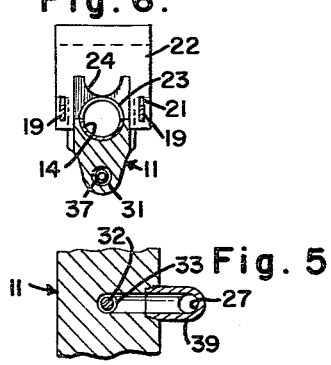
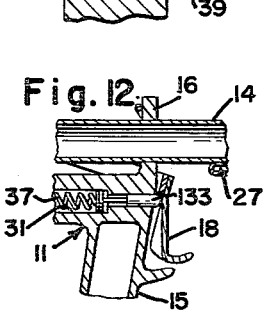
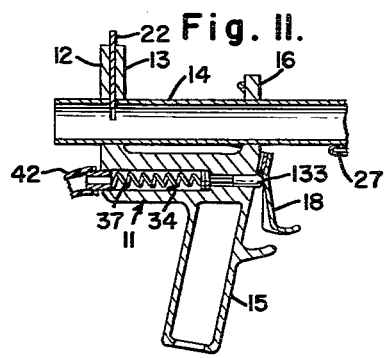
INVENTOR.
Frank H. Ine United States Patent Office 3,099,039
Patented July 30, 1963

3,099,039
EVISCERATING METHOD
Frank H. Ine, Milwaukee, Wis., assignor to John Mohr & Sons, Chicago, Ill., a corporation of Illinois
Original application Feb. 27, 1958, Ser. No. 717,964, now Patent No. 2,997,736, dated Aug. 29, 1961. Divided and this application June 26, 1961, Ser. No. 128,289
4 Claims. (Cl. 17—45)

This invention relates to a new and improved device and method for eviscerating poultry and the like. More particularly, the invention relates to the art of removing organs, such as kidneys and lungs, from the pleural cavity of animals, especially fowl, such as turkeys and chickens. This application is filed as a division of my copending application Serial No. 717,964, filed February 27, 1958, now Patent No. 2,997,736 issued August 29, 1961.

Reference is made to U.S. Patent No. 2,723,831, dated November 15, 1955, which discloses a vacuum nozzle valve useful in the removal of viscera, such as lungs, from poultry.

Although, it is quite feasible in many instances to remove lungs and other body organs from the pleural cavities of poultry under the influence of suction and mechanical manipulation as may be obtained utilizing a vacuum nozzle device of the type previously indicated in said prior patent, it is generally more difficult to remove kidneys employing similar techniques. In this connection, the kidneys of turkeys and chickens appears to be more firmly adhered to the walls of the body cavity by animal tissue than other organs, such as lungs and the like. As a consequence, it has been found difficult to rapidly and effectively remove kidneys utilizing only the force of suction in conjunction with mechanical manipulation obtainable using a vacuum nozzle device of the type mentioned.

It is a principal object and feature of the present invention to provide a method for directing a relatively high velocity fluid jet stream of air or water in such manner as to impinge against and rupture the animal tissue connecting the body organs with the walls of the pleural cavity while simultaneously subjecting the organ to suctional forces. In the embodiment of apparatus suitable for practicing the method shown on the accompanying drawings, there is provided in conjunction with a suction tube having a sufficient diameter to envelop the body organ to be removed a fluid jet tube having a discharge nozzle of such smaller cross-section than the vacuum tube and disposed adjacent the periphery of the vacuum tube intake end in such manner as to direct a fluid stream of air or water from the periphery toward the center of the vacuum tube intake end. The action of the jet stream striking or impinging against the organ tends to rupture the tissues adhering the organ to the body cavity, and thereby loosens the organ sufficiently to permit its withdrawal through the suction tube.

In one embodiment of the apparatus to be described herein in more detail, there is provided a hand actuated trigger grip mechanism that is operable to cause simultaneous opening of both the vacuum valve and the valve mechanism that controls the discharge of fluid under pressure through the jet tube. In a second embodiment of the apparatus to be described herein, the trigger mechanism is operable to sequentially first open the vacuum valve and then open the valve mechanism controlling the fluid through the jet tube.

Other objects and advantages of the invention will become apparent upon reading the following specification and referring to the accompanying drawings in which similar characters of reference represent corresponding parts in the several views.

Figures 2, 4:
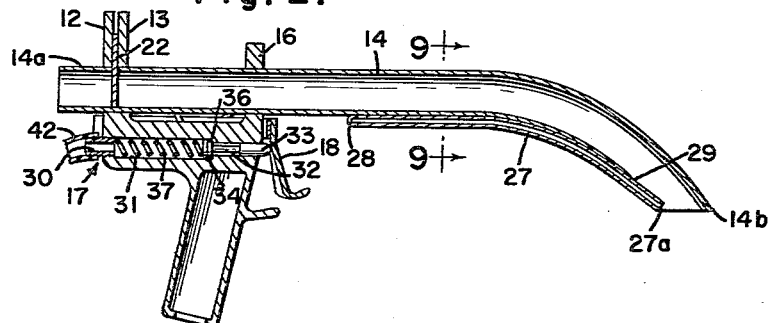
Figures 8, 9:
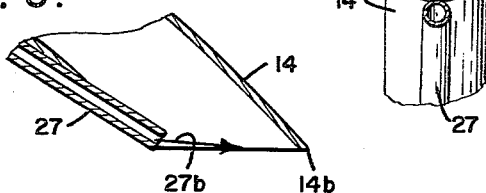

In the drawings:
FIG. 1 is a perspective view of an embodiment of the apparatus suitable for practice of the process according to the invention;
FIG. 2 is a longitudinal sectional view of one specific embodiment of the apparatus showing certain parts in one condition of operation;
FIG. 3 is a fragmentary side elevational view of the unit showing the parts in a second condition of operation;
FIG. 4 is a view taken substantially on line 4—4 of FIG. 3.
FIG. 5 is a fragmentary view taken substantially on line 5—5 of FIG. 4;
FIG. 6 is a sectional view taken substantially on line 6—6 of FIG. 3, and showing the vacuum control valve in open condition;
FIG. 7 is the same as FIG. 6 but showing the valve assembly in open condition;
FIG. 8 is an enlarged sectional view of the intake end of the vacuum tube;
FIG. 9 is an enlarged sectional view taken on line 9—9 of FIG. 2;
FIG. 10 is a fragmentary longitudinal sectional view of a modified embodiment of the apparatus showing certain parts in a first condition of operation;
FIG. 11 is the same as FIG. 10 showing the parts in a second condition of operation;
FIG. 12 is a fragmentary view of FIG. 11 showing the parts in a third condition of operation.

The vacuum nozzle valve component of the instant apparatus may be constructed generally in accordance with the disclosure of my prior U.S. Patent No. 2,723,831, dated November 15, 1955, with perhaps only certain details of construction varied in accordance with practical design or engineering considerations. More specifically, the vacuum tube and valve component shown in the annexed drawings includes a body portion, indicated generally at 11, and comprising a pair of spaced vertical plates 12 and 13 formed with registering circular apertures snugly receiving and supporting the outer circumference of vacuum tube 14 projected through the apertures. The body member comprises also a front supporting plate 16 likewise apertured and circumferentially embracing and supporting the outer circumference of the vacuum tube 14. The body 11 includes further a portion housing a valve assembly indicated generally at 17 (to be described hereinafter in more detail) and a depending grip 15 which may be conveniently contacted by the hand and fingers of an operator. The forward end of the body supports a hingedly mounted trigger 18 which can be actuated by hand pressure rearwardly toward the grip 15.

A pair of rearwardly extending levers 19 are formed integrally with the trigger 18. The rearward extremities of levers 19 are pivotally slidably projected through slots 21 formed in opposite sides of vacuum gate valve 22, which, in turn, is slidably mounted for relative upward and downward reciprocation between plates 12 and 13. Tube 14 is formed with a transverse slot 23 in vertical registry with the space between plates 12 and 13. The semi-circular valve element portion 24 of the gate valve 22, being complementally shaped with reference to the interior circumference of the vacuum tube, can slidably move within slot 23 to effectively block off air passage through the said tube 14. A wire spring 26 mounted on front supporting plate 16 is provided with rearward extremities 26a engaged with and biasing downwardly levers 19 to normally maintain the gate valve 22 spring urged to closed position.

From the foregoing description it can be understood that when trigger 18 is squeezed inwardly toward grip 15, the rearward extremities of lever arms 19 will swing upwardly causing the gate valve 22, and particularly the semi-circular gate valve element 24 thereof, to raise out of registry from the interior passage of tube 14. In normal operation, the rearward terminus 14a of the tube will be connected to a suitable vacuum source (not shown), so that when the gate valve 22 is swung upwardly from its closed position as indicated in FIG. 6 to its open position as shown in FIG. 7, vacuum communication is established from the source to the forward or intake end 14b of the tube.

The present apparatus provides in conjunction with a vacuum tube assembly, preferably of the type hereinabove described, a jet tube or nozzle such as indicated at 27, and which is adapted to discharge a relatively high velocity stream of fluid, such as air or water, adjacent the intake end of the vacuum tube. As will more fully appear, the discharge end of the jet nozzle 27 is arranged to direct the fluid jet stream from the periphery toward the center of the vacuum tube intake end.

The cross-section or diameter of the jet nozzle 27 is much smaller than the diameter of the vacuum tube so that the stream discharged from the tube is adapted to impinge with considerable localized force against a body organ (such as a kidney) to rupture and loosen the animal tissues adhering the organ to the body cavity of the animal. As previously indicated the intake end of the vacuum tube is, in operation, placed over the body organ to be removed, and the jet stream injected against the tissues adhering the organ to the body cavity is intended to assist in the rupturing and loosening of same.

It will be observed that the jet tube 27 may be affixed as by soldering or welding to the underside of the vacuum tube 14, and in such relation, the jet tube 27 follows generally the curvatured contour of the vacuum tube 14. However, toward the forward or intake end extremities of the vacuum tube the latter is longitudinally slotted to permit the end of the tube 27 to be bent or curved inwardly toward the center axis of the vacuum tube. This permits the discharge end of the jet tube 27 to be axially pointed or directed inwardly so as to direct the high velocity fluid stream toward the center of the intake end of said vacuum tube as aforesaid. It is noted that the intake end 14b of tube 14 is bevelled defining an oblique angle relative to the tube axis, and that the jet nozzle discharge end is located adjacent the shorter or inner cut side of the bevel.

The valve mechanism for controlling the flow through the jet nozzle 27 has been heretofore indicated generally by the reference numeral 17.

More specifically, assembly 17 as shown in FIGS. 2 and 4 as comprising a hose coupling or fitting 30, adapted to be connected to a suitable source (not shown) of air or water pressure, threadedly fitted into an elongated passage 31 formed in the intermediate portion of body 11.

Passage 31 terminates in a valve chamber 32 of reduced diameter which slidably mounts the stem 33 of valve element or head 34. As shown in the drawings, valve head 34 is adapted to seat against the shoulder or seat 36 defined by the juncture between passage 31 and valve chamber 32. A valve spring 37 is mounted in passage 31 with its opposite ends abutting threaded nipple 30 and valve head 34 respectively to normally bias the latter into engagement with seat 36. The rearward extremities of tube 27 are connected by a suitable fitting or coupling 39 which, in turn, communicates via port 41 (formed through body 11) with the valve chamber 32.

The outer extremities of valve stem 33 project beyond the front surface of body 11 into contact with the inner face of trigger 18. In the embodiment shown in FIG. 2 the length of the valve stem 33 is such that the outer tip of the stem contacts the trigger 18 when the latter is in its maximum extended position. Hence, it will be understood that when the trigger 18 is squeezed toward the grip 15, the valve stem 33 and valve head 34 carried thereby will be thrust rearwardly causing the head to unseat from shoulder 36 and permitting the passage of fluid under pressure and at substantially high velocity from its source via coupling 30, passage 31, chamber 32, port 41, fitting 39 and jet tube 27 to the discharge or nozzle end of the latter. It may be observed that the contraction of the trigger 18 will cause substantially simultaneous opening of the vacuum control valve 22 and the jet stream actuating valve 34—36. Consequently, the vacuum tube 14 will commence sucking air through its intake end 14b at the same moment that high velocity fluid will be discharged toward the center thereof through the said jet nozzle 27.

FIGS. 10, 11 and 12 indicate a modified embodiment of the apparatus. The modification may be considered identical in all respects to the previously described device, except that the outwardly extended length of the valve stem 133 incorporated in the FIGS. 10–12 embodiment is made substantially shorter than the extended length of previously described valve stem 33 shown in FIG. 2. Except for this distinction, corresponding components of the two illustrated embodiments are numbered identically in the drawings for purposes of convenient understanding and reference.

The purpose of making the extended length of valve stem 133 shorter than counterpart stem 33 of the previously described embodiment is to permit sequential, rather than simultaneous, actuation of the vacuum control valve and the jet stream control valve assembly. Thus, and as shown in FIG. 10, when the trigger 18 of the unit is in its maximum extended position as shown, it is seen that the outer extremity of the stem 133 is spaced a substantial distance inwardly from the said trigger. FIG. 11 illustrates that it is not until the trigger 18 has moved through a very substantial portion of its inward arcuate swing that valve stem 133 is contacted by it and thrust inwardly to cause unseating of the valve head 34. On the other hand this movement of the trigger will have caused the relatively long lever arms 19 to swing almost to their maximum upward positions and cause full opening of the vacuum tube gate valve 22 before the trigger contacts and actuates valve stem 133. It is appreciated that if the trigger 18 is moved only to the approximate position shown in FIG. 11 and maintained in such position, the device may be used as a vacuum tube without actuating the jet stream valve control assembly at all. However, upon further rearward movement of the trigger (as illustrated in FIG. 12) the valve stem 133 will be contacted and moved axially rearwardly against the force of spring 37 to cause unseating of the valve head 34. This latter said movement will establish flow communication through the jet tube 27 in the manner above explained.

As also noted earlier, it is contemplated that either air or water may be used as the jet fluid. By way of example, and not by way of specific limitation, air under 50–70 p.s.i. introduced through a 3/16" I.D. jet nozzle will suffice to assist greatly in the rupturing and loosening kidneys from the body cavities of turkeys and chickens. Water under pressure of 40–60 p.s.i. discharged through a tube of similar cross-section will also satisfactorily accomplish the same objectives.

Although the present invention has been described in some detail by way of illustration and example for purposes of clarity and understanding, it is appreciated that certain changes and modifications may be made within the spirit of the invention and the scope of the claims appended hereto.

I claim:

1. A method of removing animal organs, such as poultry kidneys, connected by tissue to a body cavity, the steps of subjecting the tissues connecting the organ to the body cavity to a localized fluid jet stream of sufficient velocity and impinging force to enhance rupturing and loosening of the connecting tissues from the body, and simultaneously subjecting said organ to localized suctional forces adjacent said jet stream tending to withdraw said organ from said cavity.

2. The method of claim 1 and wherein said stream comprises an air jet stream.

3. The method of claim 1 and wherein said stream comprises a water jet stream.

4. A method of removing animal organs, such as poultry kidneys, connected by tissue to a body cavity, the steps of subjecting the tissues connecting the organ to the body cavity to a localized fluid jet stream of sufficient velocity and impinging force to enhance rupturing and loosening of the connecting tissues from the body, simultaneously subjecting said organ to suctional forces, and withdrawing said organ and fluid stream with said suctional forces.

References Cited in the file of this patent
UNITED STATES PATENTS

| | | |
|---|---|---|
| 2,448,693 | Trelease et al. | Sept. 7, 1948 |
| 2,795,817 | Dahlberg | June 18, 1957 |